(12) United States Patent
Popescu et al.

(10) Patent No.: US 7,535,205 B2
(45) Date of Patent: May 19, 2009

(54) SYSTEM AND METHOD FOR A BRIDGELESS POWER SUPPLY

(75) Inventors: Lucian Popescu, Austin, TX (US); William O. Bain, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 201 days.

(21) Appl. No.: 11/693,822

(22) Filed: Mar. 30, 2007

(65) Prior Publication Data
US 2008/0239765 A1  Oct. 2, 2008

(51) Int. Cl.
G05F 1/10 (2006.01)
G05F 1/652 (2006.01)

(52) U.S. Cl. .................. 323/222; 323/223; 323/282; 323/284

(58) Field of Classification Search .............. 323/222, 323/282, 284, 223
See application file for complete search history.

(56) References Cited

U.S. PATENT DOCUMENTS

| | | | |
|---|---|---|---|
| 5,960,207 A | 9/1999 | Brown | |
| 6,487,097 B2 | 11/2002 | Popescu | |
| 6,525,513 B1 * | 2/2003 | Zhao | 323/222 |
| 7,164,591 B2 * | 1/2007 | Soldano | 363/89 |
| 7,218,541 B2 | 5/2007 | Price et al. | |
| 7,250,742 B2 * | 7/2007 | Li | 323/207 |
| 7,304,457 B1 * | 12/2007 | Huang | 323/222 |
| 7,355,868 B2 * | 4/2008 | Soldano | 363/89 |
| 2005/0024016 A1 | 2/2005 | Breen et al. | |
| 2007/0046105 A1 | 3/2007 | Johnson et al. | |

OTHER PUBLICATIONS

"Bridgeless PFC Implementation Using One Cycle Control Technique," Bing Lu et al., Virginia Polytechnic Institute and State University, International Rectifier, Blacksburg, VA pp. 1-6, Apr. 2005.
U.S. Appl. No. 11/565,620.

* cited by examiner

*Primary Examiner*—Bao Q Vu
(74) *Attorney, Agent, or Firm*—Larson Newman Abel & Polansky, LLP

(57) ABSTRACT

A system and method for a bridgeless power supply is disclosed. The bridgeless power supply includes a digital control module that controls a first switch, a second switch, and a transistor, thereby the bridgeless power supply rectifies an alternating current (AC) variable input voltage and regulates a direct current (DC) output voltage. The digital control module applies a first and second control signal to the first and second switches thereby rectifying and regulating the AC variable input voltage. Additionally, the digital control module provides a high frequency and constant duty cycle third control signal to the transistor in series with an output transformer of the bridgeless power supply device, to assure primary-to-secondary isolation.

20 Claims, 9 Drawing Sheets

SYSTEM AND METHOD FOR A BRIDGELESS POWER SUPPLY

FIELD OF THE DISCLOSURE

This disclosure relates generally to power supplies, and relates more particularly to a bridgeless power supply.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

A classic desktop computer AC-DC power supply uses three different stages to convert an AC input voltage to a regulated DC output voltage. The three power processing stages are an input diode rectification bridge, an active power factor correction (PFC) boost pre-regulator and a DC-DC buck regulator with multiple outputs. Each power processing stages has power losses, which add together to negatively impact the overall power conversion efficiency. Additionally, the complexity of the AC-DC power supply circuitry increases the cost and lowers the overall performance reliability of the AC-DC power supply.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

A bridgeless power supply is disclosed. The bridgeless power supply includes a digital control module that controls a first switch, a second switch, and a transistor; thereby the bridgeless power supply rectifies an alternating current (AC) input voltage and regulates a direct current (DC) output voltage. The first and second switches are in a bridge configuration with two diodes, and the digital control module applies a first and second control signal to the first and second switches thereby rectifying the AC input voltage. The digital control module provides a high frequency and constant duty cycle third control signal to the transistor in series with an output transformer of the bridgeless power supply device, to provide primary-to-secondary isolation. The output voltage of the circuit is based on the rectified input voltage and the duty cycle of the third control signal applied to the transistor.

Figure 1:
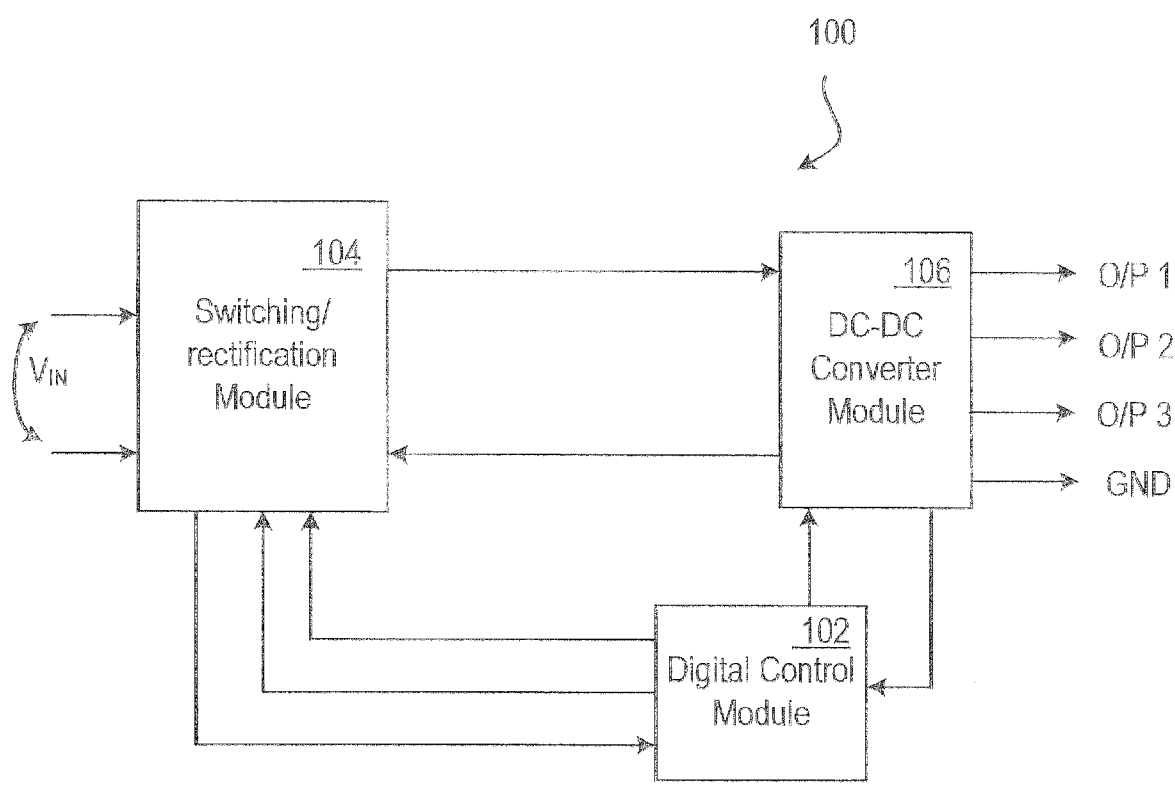
FIG. 1 is a block diagram of a bridgeless power supply device.

FIG. 1 shows a block diagram of a bridgeless power supply device 100 including a digital control module 102, a switching/rectification module 104, and a DC-DC converter module 106. The digital control module 102 sends a first control signal and a second control signal to the switching/rectification module 104. The switching/rectification module 104 uses the first and second control signals to rectify and regulate an alternating current (AC) input voltage, labeled $V_{IN}$. A third control signal is applied by the digital control module 102 to the DC-DC converter module 106, and the DC-DC converter module uses the third control signal to reduce the rectified and regulated voltage from the switching/rectification module 104 to a lower and constant direct current (DC) voltage. The DC-DC converter module 106 has a plurality of outputs that supply different DC output voltages to different components attached to the bridgeless power supply 100 based on the regulated DC voltage. The digital control module 102 receives information about the output signal, the plurality of output terminals and the input voltage from a first input terminal and a second input terminal, and uses this information to constantly adjust the duty cycle of the first and second control signals applied to the first and second switches.

Figure 2:
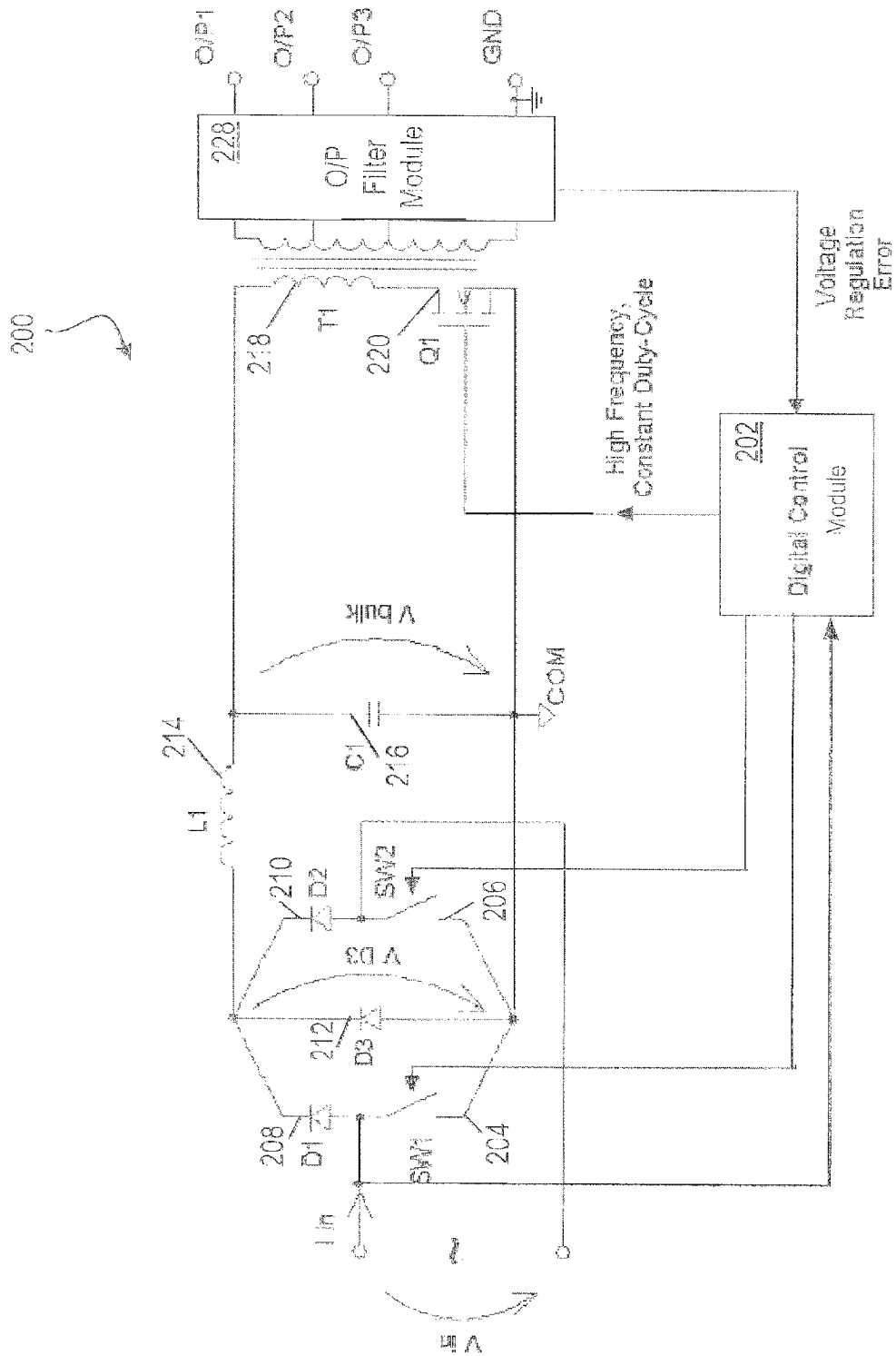
FIG. 2 is a combined circuit and block diagram of a particular embodiment of the bridgeless power supply device.

FIG. 2 shows a combined circuit and block diagram of a particular embodiment of a bridgeless power supply device 200. The bridgeless power supply device 200 includes a digital control module 202, a first switch 204, a second switch 206, a first diode 208, a second diode 210, a third diode 212, an inductor 214, a capacitor 216, a transformer 218, a MOSFET transistor 220 and an output filter module 228. The digital control module 202 includes a first input terminal, a second input terminal, a first output terminal, a second output terminal and a third output terminal. The first switch 204 includes a first terminal connected to a first voltage reference of an input voltage, labeled $V_{IN}$, and a second terminal. The second switch 206 includes a first terminal connected to a second voltage reference of the input voltage and a second terminal connected to the second terminal of the first switch 204. The first diode 208 includes a first terminal and a second terminal connected to the first terminal of the first switch 204. The second diode 210 includes a first terminal connected to the first terminal of the first diode 208 and a second terminal connected to the first terminal of the second switch 206. The third diode 212 includes a first terminal connected to the first terminal of the first diode 208 and a second terminal connected to the first terminal of the first switch 204.

The inductor 214 includes a first terminal and a second terminal connected to the first terminal of the first diode 208. The capacitor 216 includes a first terminal connected to the first terminal of the inductor 214 and a second terminal connected to the second terminal of the first switch 204. The transformer 218 includes a primary winding and a secondary winding. The primary winding of the transformer 218 includes a first terminal connected to the first terminal of the inductor 214 and a second terminal. The secondary winding of the transformer includes a first terminal connected to a third voltage. reference, labeled GND, and a plurality of terminals connected to the output filter module 228. The transistor 220 includes a first current electrode connected to the second terminal of the primary winding of the transformer 218, a second current electrode connected to the second terminal of the first switch 204, and a control electrode connected to the third output terminal of the digital control module 202.

The bridgeless power supply device 200 eliminates the need for an input rectification diode bridge to rectify an AC input voltage. Instead, the bridgeless power supply device 200 uses the digital control module 202 to drive the first switch 204 and the second switch 206 are thereby rectify and regulate the input voltage. To perform all the functions of a classic power supply without the same power losses, the first and second switches 204 and 206 and the first and second diodes 208 and 210 are placed in a bridge configuration and combined with the third diode 212, a freewheeling diode. These functions of a classic power supply are input voltage rectification, power factor correction (PFC) and output voltage regulation. The bridgeless power supply device 200 works as a buck converter to regulate the input voltage to a constant DC output voltage. During operation of the bridgeless power supply device 200, half of the bridge configuration is active at one time, alternating for each semi-period of the input voltage and only when the input voltage is higher than the regulated bulk voltage, labeled $V_{BULK}$. When input voltage is lower than the regulated bulk voltage, the first switch 204 and the second switch 206 are off. The next stage in the bridgeless power supply device 200 uses a fixed high frequency duty cycle control signal to create a buck converter and to assure primary-to-secondary isolation. This isolated fixed duty cycle buck converter has much smaller magnetic components and the digital control module 202 has a much simpler control for driving the transistor 220. The output filter module 228 includes multiple outputs of the bridgeless power supply device. The digital control module 202 receives information about an output voltage, $V_{OUT}$ and the input voltage from the first input terminal and the second input terminal, which is used to adjust the duty cycle of the first and second control signals sent to the first and second switches 204 and 206. Additionally, the digital control module 202 can provide useful features such as standby low power consumption mode and protections.

Figure 3:
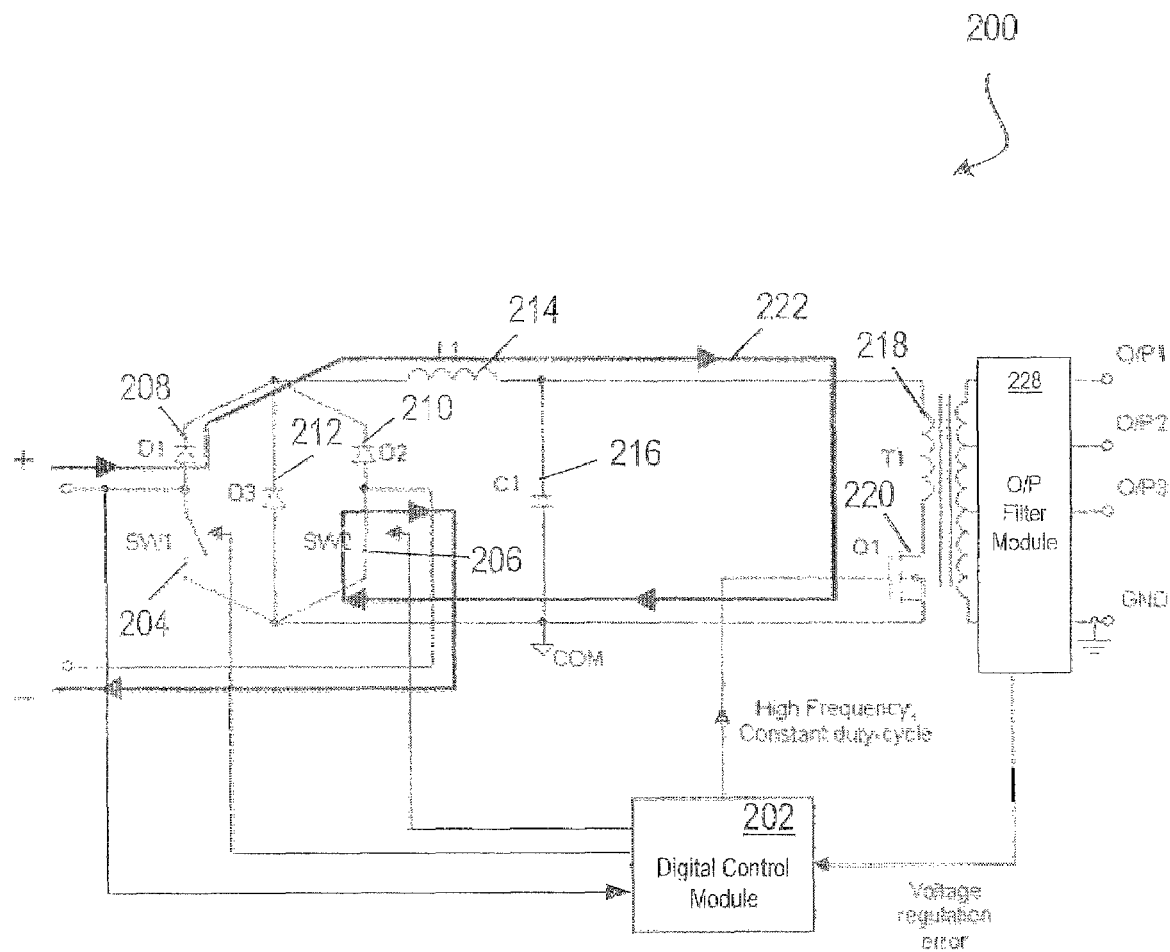
FIG. 3 is the combined circuit and block diagram illustrating a first current flow in the embodiment of FIG. 2.

FIG. 3 shows the bridgeless power supply device 200 with a first current path 222. To enable the current to flow along the first current path 222, the digital control module applies a first control signal to the first switch 204 and a second control signal to the second switch 206. The first control signal opens the first switch 204 and the second control signal closes the second switch 206 to make a first configuration of the bridgeless power supply device 200. This first configuration allows current to travel along the first current path 222 from the first voltage reference of the input voltage, to the primary winding of the transformer 218 and then to the second voltage reference of the input voltage. During this first configuration the inductor 214 also stores part of the energy provided by the input, to be applied later to the output stage of the bridgeless power supply device 200. The digital control module 202 applies a third control signal, having a constant duty cycle, to the transistor 220. The third control signal turns the transistor 220 on and off with a constant high frequency duty cycle providing a load proportional with the one in the output, so that the current from the input voltage will flow along the first current path 222.

Figure 4:
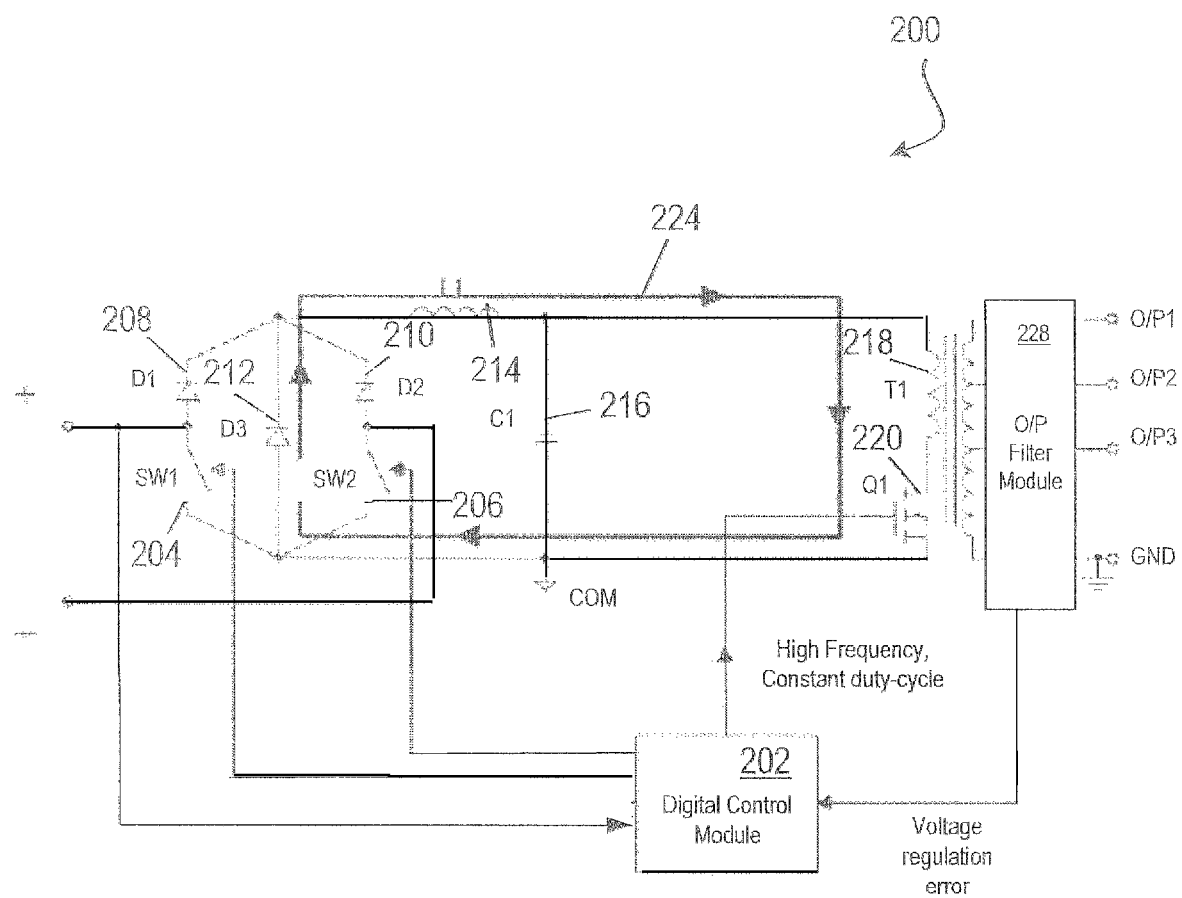
FIG. 4 is the combined circuit and block diagram illustrating a second current flow in the embodiment of FIG. 2.

FIG. 4 shows the bridgeless power supply device 200 with a second current path 224. In this configuration of the bridgeless power supply, the first control signal opens the first switch 204 and the second control signal opens the second switch 206. When both the first switch and the second switch are open, the input voltage is not applied to the bridgeless power supply device 200, allowing the energy stored in the inductor 214 to be transferred to the output.

The bridgeless power supply device 200 with the second current path 224 through the third diode 212, the inductor 214, the transformer 218 and the transistor 220 works as a buck converter with the addition of the capacitor 216. The buck converter takes the input voltage and turns it on and off through an output load, such as the transformer 218, at a variable duty cycle, rectifying and regulating the bulk voltage $V_{BULK}$ across the capacitor 216. The output voltage of the buck converter is the product of the input voltage and the duty cycle applied to the input voltage. The transformer 218 has a plurality of outputs based on the respective number of turns in the transformer, and the regulated DC voltage across the transformer 218 and the transistor 220.

Figure 5:
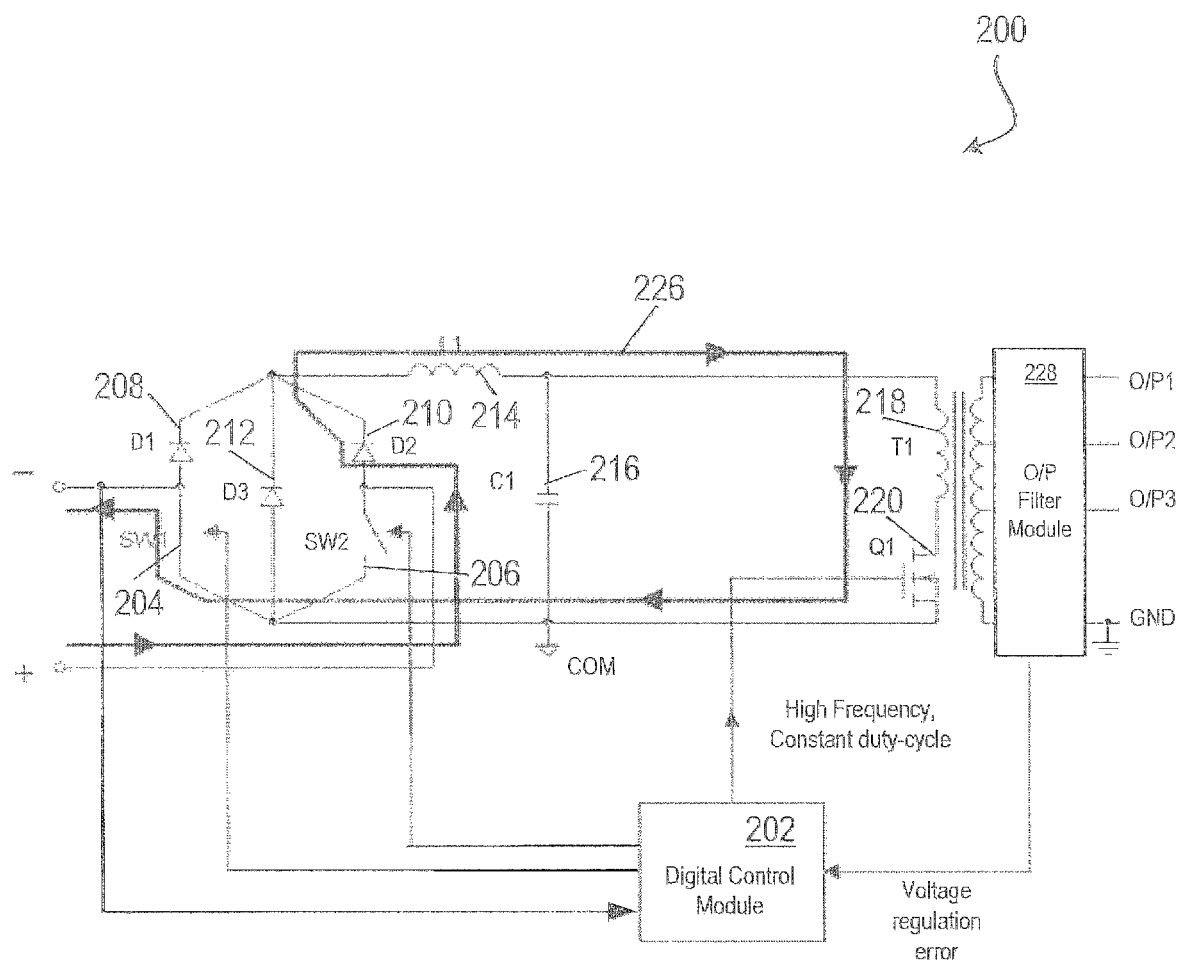
FIG. 5 is the combined circuit and block diagram illustrating the third current flow in the embodiment of FIG. 2.

FIG. 5 shows the bridgeless power supply device 200 with a third current path 226. In this configuration of the bridgeless power supply device 200, the first control signal closes the first switch 204 and the second control signal opens the second switch 206. With the switches in such a configuration the current will still flow in the same direction through the transformer 218 and the transistor 220 as the first current path 222, even though the polarity of the AC input voltage, $V_{IN}$, has been reversed. This setup of the switches provides rectification of the input voltage so that the voltage through the transformer 218 and the transistor 220 will always be positive. The polarity of the input voltage is such that the current flows along the third current path 226 from the second voltage reference of the input voltage, through the inductor 214, then through the primary winding of the transformer 218 and transistor 220 and then to first voltage reference of the input voltage.

Figure 6:
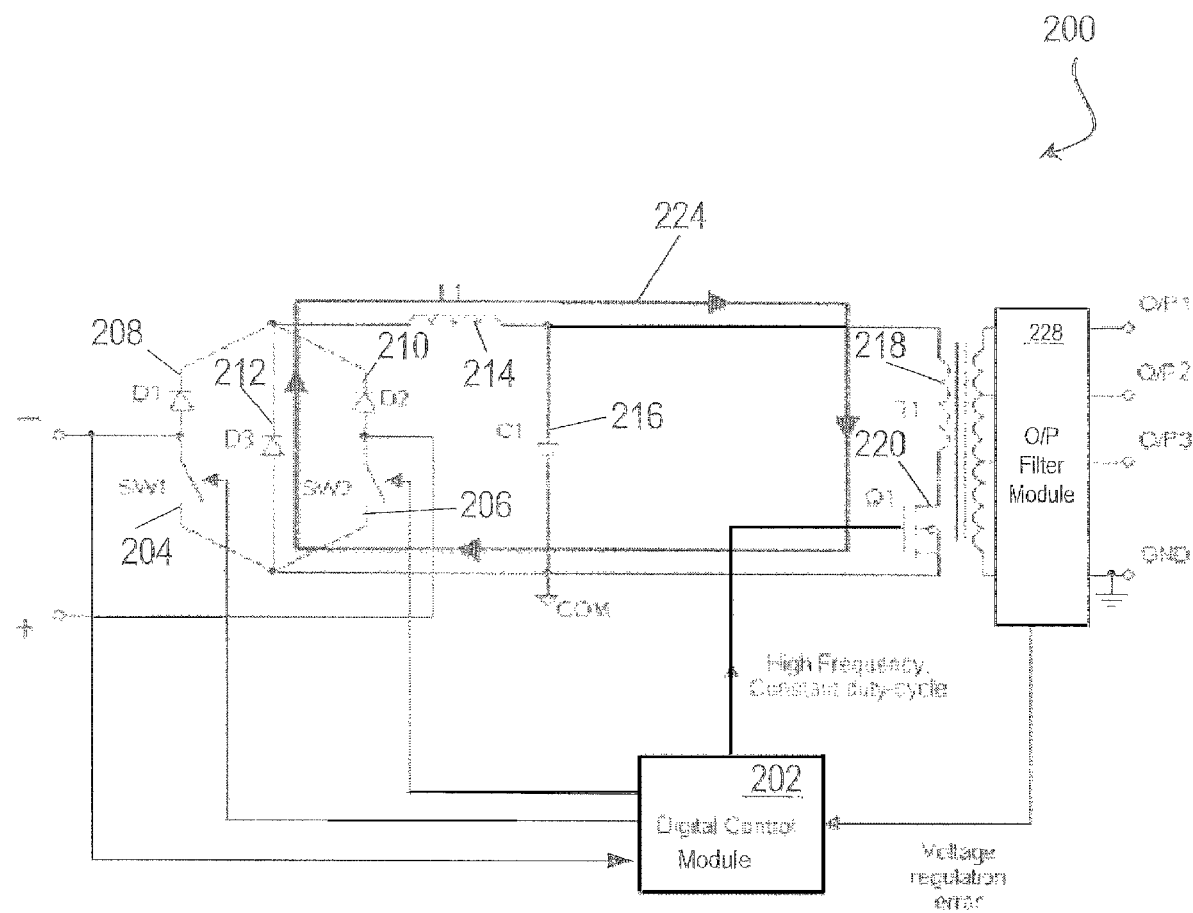
FIG. 6 is the combined circuit and block diagram illustrating the second current flow in the embodiment of FIG. 2.

FIG. 6 shows the bridgeless power supply device 200 with the second current path 224. After the first control signal closes the first switch and the second control signal opens the second switch, the first and second control signals open the first switch 204 and the second switch 206 respectively. This enables the current to flow along the second current path 224 again and the bridgeless power supply device 200 to work the same as described in FIG. 4 above, after the input voltage has been rectified in FIG. 5.

Figure 7:
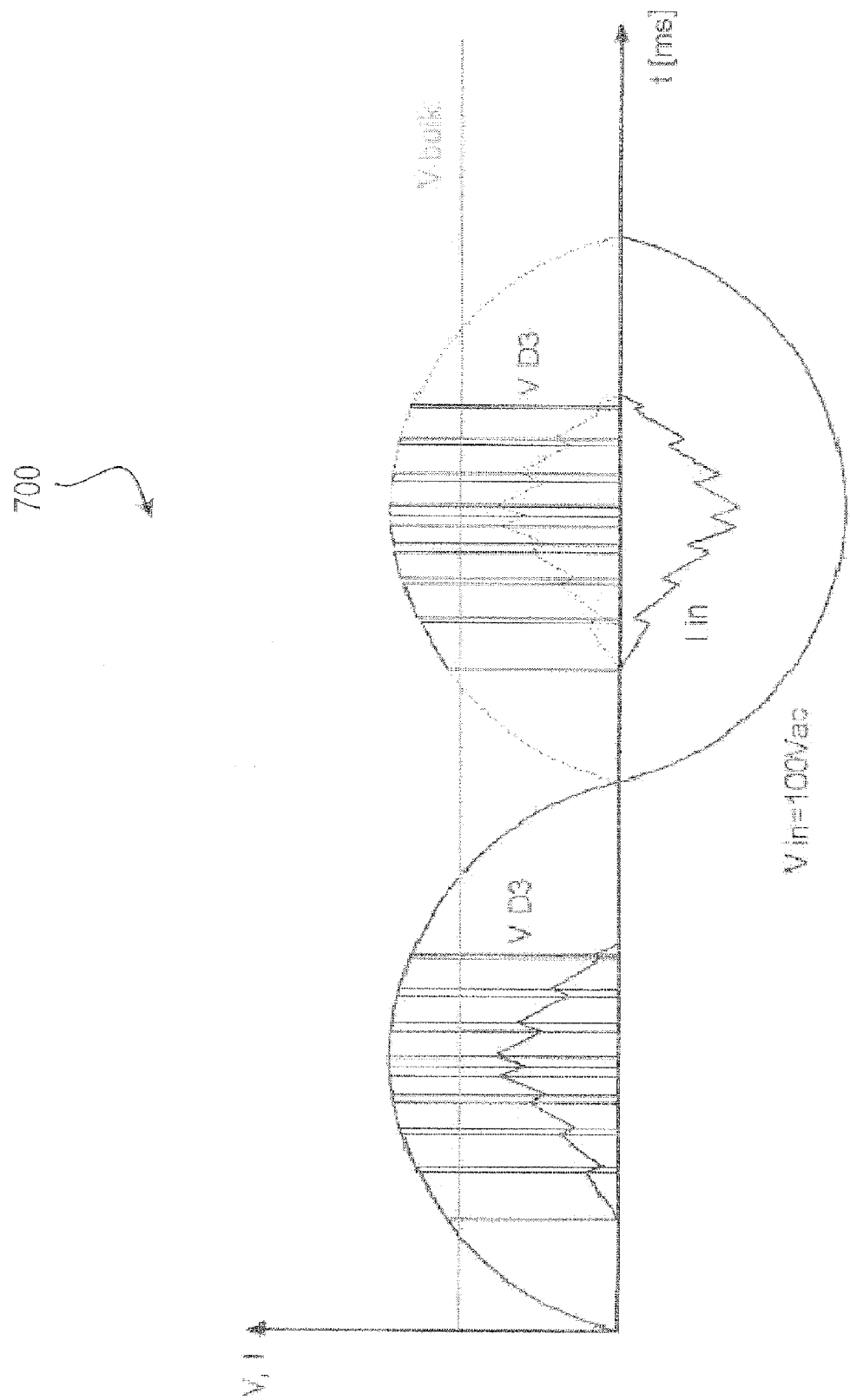
FIG. 7 is a graph of the rectification of a low input voltage of the embodiment of FIG. 2.

FIG. 7 shows a graph 700 of the rectification of an input voltage of 100 V AC applied to the circuit and block diagram of FIG. 2. As shown from the graph 700 the output voltage, $V_{BULK}$, is based on the duty cycle applied to the rectified AC input signal, labeled V D3. The current $I_{IN}$ and the voltage $V_{IN}$ are measured at the first voltage reference of the input voltage, whereas $V_{BULK}$ is measured across the capacitor 216 which is the same voltage as across the transformer 218 and transistor 220.

Figure 8:
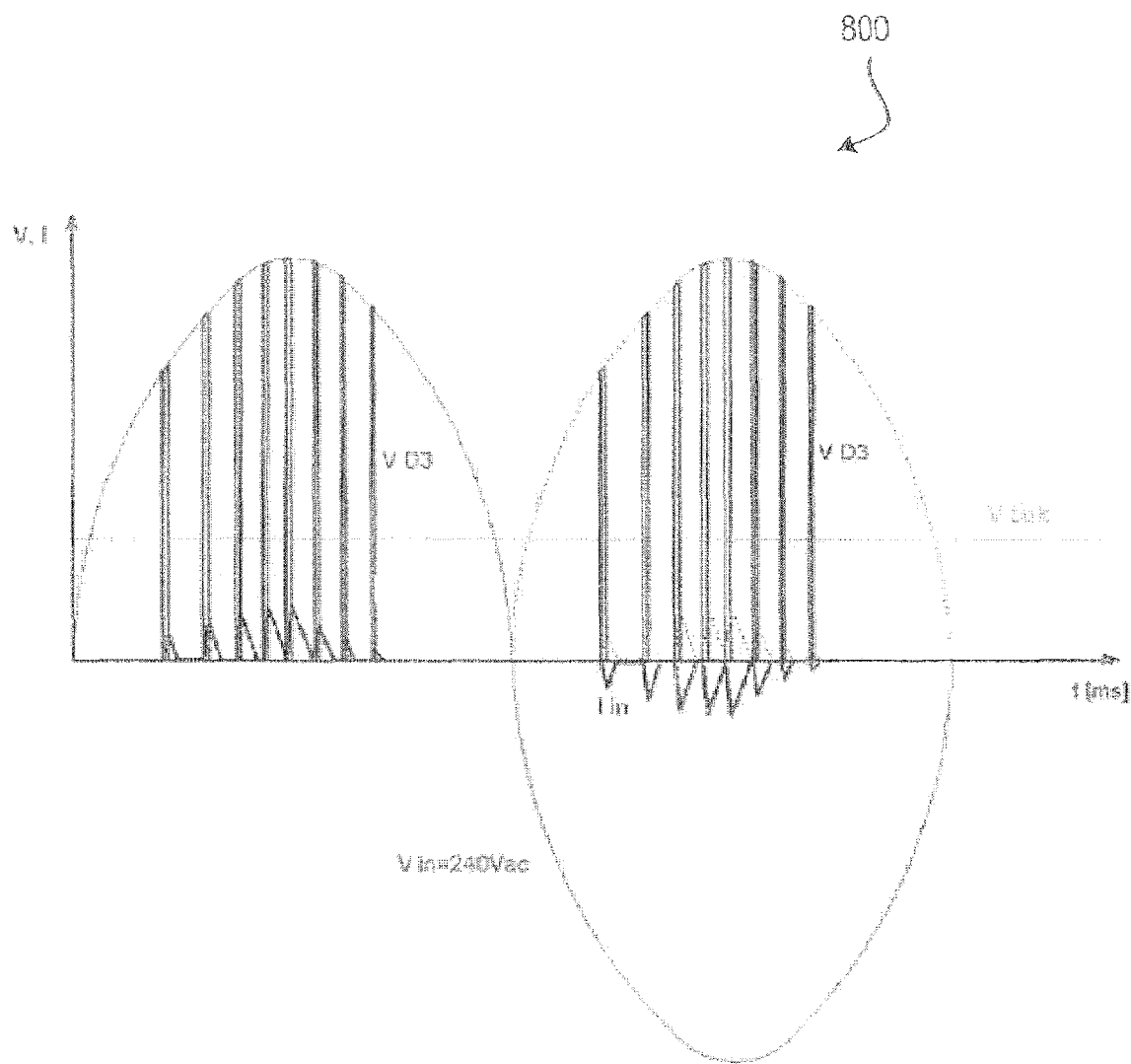
FIG. 8 is a graph of the rectification of a high input voltage of the embodiment of FIG. 2.

FIG. 8 shows a graph 800 of the rectification of an input voltage of 240V AC applied to the circuit and block diagram of FIG. 2. FIGS. 7 and 8 show that to obtain the same $V_{BULK}$ for different input voltages, the duty cycle of the first control signal applied to the first switch 204 and second control signal applied to the second switch 206 have to be different.

Figure 9:
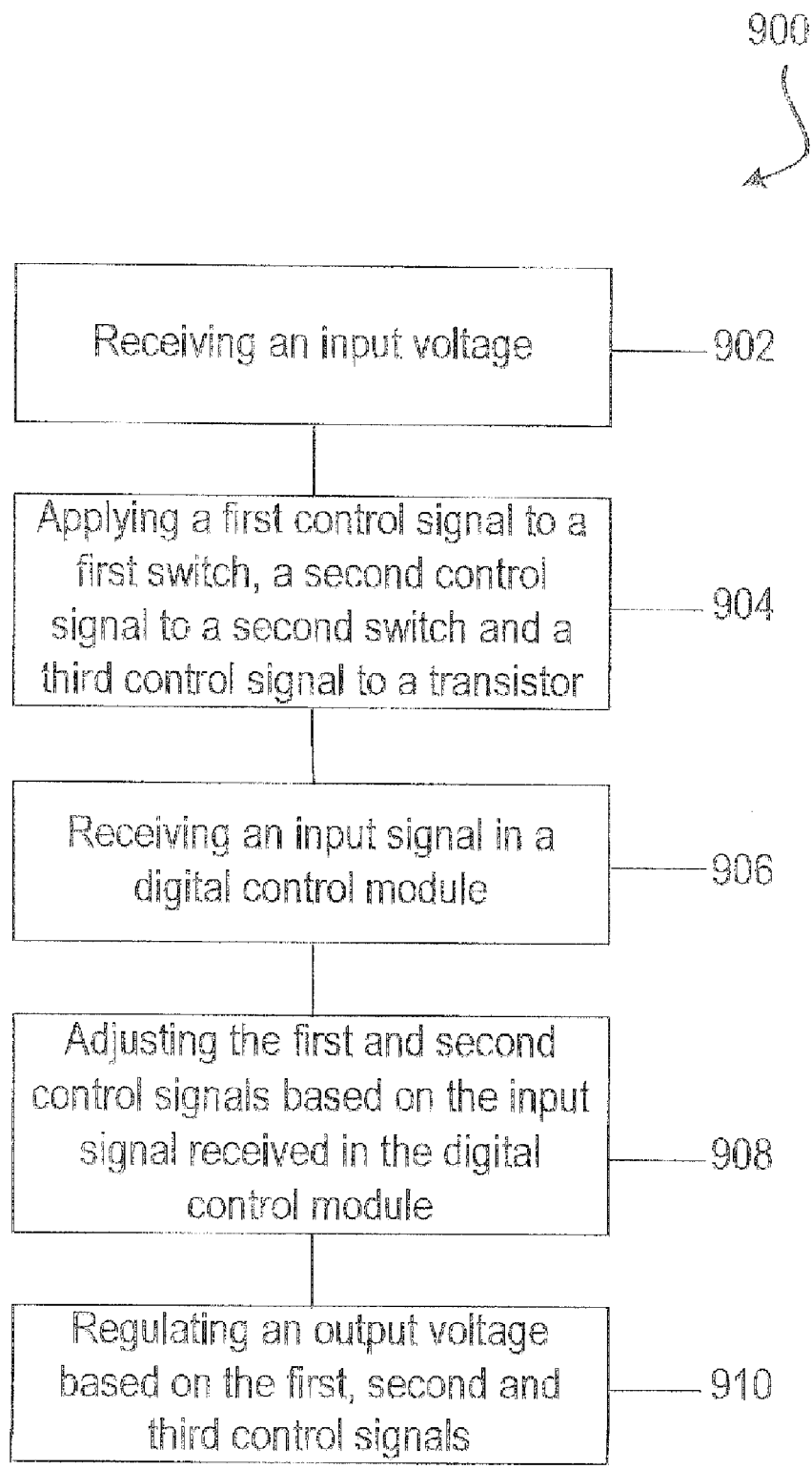
FIG. 9 is a flow chart of a method for supplying an output voltage in a bridgeless power supply device.

FIG. 9 shows a flow chart 900 of a method for supplying an output voltage in the bridgeless power supply device 200. In step 902 the bridgeless power supply device 200 receives an input alternating current (AC) voltage, which will be rectified and converted to a regulated direct current (DC) output voltage. In step 904 a digital control module applies a first control signal to a first switch, a second control signal to a second switch and a third control signal to a transistor to control the flow of the current through the bridgeless power supply device 200. The digital control module receives an input signal containing information about the input voltage, and the output voltage in step 906. In step 908 the digital control module adjusts the first control signal applied to the first switch and the second control signal applied to the second switch based on the input signal received in the digital control module. In step 910, the output voltage is regulated to a constant DC voltage that is less than the AC input voltage based on the first control signal applied to the first switch, the second control signal applied to the second switch and the control signal applied to a transistor coupled to an output load of the bridgeless power supply device 200.

Each power processing stage in the bridgeless power supply device 200 has lower power losses than the power processing stages in classic power supplies, and as a result the overall power conversion efficiency is increased. The bridgeless power supply device 200 increases the performance efficiency of the different power stages, as compared to classic power supplies, so that the overall performance efficiency of the bridgeless power supply device is above 80%. The increased efficiency is accomplishes in the bridgeless power supply device 200 without an increase in the cost, because the circuitry for the bridgeless power supply device is less complex than other power supplies that try to increase the performance efficiency.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply device comprising:
   a first switch including a first terminal connected to a first voltage reference of an input voltage and a second terminal;
   a second switch including a first terminal connected to a second voltage reference of the input voltage and a second terminal coupled to the second terminal of the first switch;
   a first diode including a first terminal and a second terminal coupled to the first terminal of the first switch;
   a second diode including a first terminal coupled to the first terminal of the first diode and a second terminal coupled to the first terminal of the second switch;
   a third diode including a first terminal coupled to the first terminal of the first diode and a second terminal coupled to the second terminal of the first switch;
   a transistor including a first current electrode, a second current electrode coupled to the second terminal of the first switch, and control electrode; and
   a digital control module including a first input terminal, a second input terminal, a first output terminal coupled to the first switch, a second output terminal coupled to the second switch, and a third output terminal coupled to the control electrode of the transistor, the digital control module operably configured to independently control the first switch, the second switch and the transistor to rectify the input voltage and regulate an output voltage.

2. The power supply device of claim 1 further comprising:
   an inductor including a first terminal and a second terminal connected to the first terminal of the first diode;
   a capacitor including a first terminal connected to the first terminal of the inductor and a second terminal connected to the second terminal of the first switch; and
   a transformer including:
      a primary winding having a first terminal coupled to the first terminal of the inductor and a second terminal coupled to the first current electrode of the transistor; and
      a secondary winding having a first terminal coupled to a third voltage reference, and plurality of output terminals.

3. The power supply device of claim 1 wherein the digital control module controls the first switch with a first control signal, and the second switch with a second control signal.

4. The power supply device of claim 3 wherein the digital control module controls the transistor with a third control signal.

5. The power supply device of claim 4 wherein the first control signal is independent of the second control signal.

6. The power supply device of claim 5 wherein the output voltage is based on the duty cycle of the first control signal, the duty cycle of the second control signal, the duty cycle of the third control signal and the voltage level of the input voltage.

7. The power supply device of claim 6 wherein the digital control module receives a feedback signal.

8. The power supply device of claim 7 wherein the digital control module adjust the duty cycle of the first control signal and the second control signal based on the feedback signal.

9. A method comprising:
   receiving an input voltage;
   applying a first control signal to a first switch;
   applying a second control signal to a second switch;
   applying a third control signal to a transistor;
   receiving one or more input signals in a digital control module;
   adjusting the first control signal applied to the first switch and the second control signal applied to the second switch based on the feedback signal received in the digital control module; and regulating an output voltage based the first control signal applied to the first switch, the second control signal applied to the second switch, and the third control signal applied to the transistor.

10. The method of claim 9 wherein the digital control module controls a duty cycle of the first control signal sent to the first switch, the second control signal sent to the second switch, and the third control signal sent to the transistor.

11. The method of claim 10 wherein the first control signal and the second control signal corresponds to the input voltage waveform.

12. The method of claim 9 wherein the input signals received in the digital control module include information about the output voltage, and the input voltage.

13. The method of claim 9 further comprising:
applying a current to a primary winding of a transformer.

14. The method of claim 13 wherein an inductor supplies the current to the primary winding when the input voltage is off.

15. The method of claim 14 wherein the output voltage is based on the current applied to the primary winding of the transformer.

16. A power supply device comprising:
a first switch including a first terminal connected to a first voltage reference of an input signal and a second terminal;
a second switch including a first terminal connected to a second voltage reference of the input signal and a second terminal coupled to the second terminal of the first switch;
a first diode including a first terminal and a second terminal coupled to the first terminal of the first switch;
a second diode including a first terminal coupled to the first terminal of the first diode and a second terminal coupled to the first terminal of the second switch;
a third diode including a first terminal coupled to the first terminal of the first diode and a second terminal coupled to the second terminal of the first switch;
a transistor including a first current electrode, a second current electrode coupled to the second terminal of the first switch, and a control electrode;
a transformer including:
a primary winding having a first terminal coupled to the first terminal of the first diode and a second terminal coupled to the first current electrode of the transistor; and
a secondary winding having a first terminal coupled to a third voltage reference, and plurality of output terminals;
an output filter module including a plurality of input terminals coupled to the plurality of output terminals of the secondary winding of the transformer, and a plurality of output terminals; and
a digital control module including a first input terminal coupled to one of the plurality of output terminals of the output filter module, a second input terminal coupled to the first voltage reference of the input signal, a first output terminal coupled to the first switch, a second output terminal coupled to the second switch and a third output terminal connected to the control electrode of the transistor, the digital control module operably configured to independently control the first switch, the second switch and the transistor to rectify the input voltage and regulate an output voltage.

17. The power supply device of claim 16 wherein the first diode, the second diode, the first switch, and the second switch are setup in a bridge configuration.

18. The power supply device of claim 16 wherein the output voltage is regulated based on the input voltage, a first control signal applied to the first switch, a second control signal applied to the second switch, and a third control signal applied to the transistor.

19. The power supply device of claim 18 wherein a duty cycle of the first control signal and the second control signal depends on the input voltage.

20. The power supply device of claim 19 wherein the digital control, the first switch, the second switch, the first diode, the second diode, and the third diode combine to rectify and regulate the input voltage.

* * * * *